(12) United States Patent
Nishida

(10) Patent No.: US 7,514,910 B2
(45) Date of Patent: **\*Apr. 7, 2009**

(54) DC-DC CONVERTER CAPABLE OF PERFORMING FOR WIDE AND DYNAMIC VOLTAGE RANGE

(75) Inventor: Junji Nishida, Neyagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,023

(22) Filed: Jan. 25, 2008

(65) Prior Publication Data

US 2008/0157738 A1    Jul. 3, 2008

Related U.S. Application Data

(63) Continuation of application No. 11/698,461, filed on Jan. 25, 2007, now Pat. No. 7,348,765.

(30) Foreign Application Priority Data

Feb. 1, 2006    (JP) ............................. 2006-024118

(51) Int. Cl.
    *G05F 1/40*    (2006.01)
(52) U.S. Cl. ...................................... 323/282
(58) Field of Classification Search ................. 323/268, 323/272, 282, 283, 284, 285, 351
    See application file for complete search history.

(56) References Cited

U.S. PATENT DOCUMENTS

| 6,346,798 | B1 | 2/2002 | Passoni et al. |
| 7,098,639 | B2 | 8/2006 | Natsume et al. |
| 7,098,640 | B2 | 8/2006 | Brown |
| 7,170,273 | B2 | 1/2007 | Sase et al. |
| 7,348,765 | B2 * | 3/2008 | Nishida ....................... 323/282 |
| 2006/0271719 | A1 * | 11/2006 | Feldstein et al. ............ 710/306 |

FOREIGN PATENT DOCUMENTS

| JP | 3459470 | 8/2003 |
| JP | 2004-260509 | 9/2004 |

* cited by examiner

*Primary Examiner*—Adolf Berhane
(74) *Attorney, Agent, or Firm*—Cooper & Dunham, LLP

(57) ABSTRACT

This patent specification describes a DC-DC converter which includes a switch configured to control an output voltage, a driver circuit configured to drive the switch, a flip-flop configured to control the driver circuit, an error amplifier configured to compare a feedback voltage of the output voltage with a reference voltage, a detector configured to sense an output current, a control voltage generator configured to generate a control voltage being ramped and a PWM comparator configured to compare the control voltage with an output voltage of the error amplifier and output a reset signal to the flip-flop. Ramping speed of the control voltage is changed in accordance with an external-control voltage input at an external-control terminal.

19 Claims, 3 Drawing Sheets

DC-DC CONVERTER CAPABLE OF PERFORMING FOR WIDE AND DYNAMIC VOLTAGE RANGE

CROSS-REFERENCE TO RELATED APPLICATIONS

This application is a Rule 1.53(b) continuation of Ser. No. 11/698,461, filed Jan. 25, 2007, now U.S. Pat. No. 7,348,765 the entire contents of which are incorporated herein by reference.

TECHNICAL FIELD

The present disclosure relates to a DC-DC converter, and more particularly to a DC-DC converter capable of performing for wide and dynamic voltage range.

BACKGROUND

Recently, a variety of communication equipments having a high performance, such as a mobile phone, have been developed rapidly and widely used. Such portable communication equipment requires a high performance power circuit for a power amplifier installed in the portable communication equipment to send a signal.

The power circuit generally includes a DC-DC converter to supply necessary power to the power amplifier. The DC-DC converter may be able to change the output voltage in accordance with an external-control voltage. There are two types of DC-DC converters which are voltage-mode and current-mode DC-DC converters.

A background voltage-mode DC-DC converter generates an output voltage by adding an offset voltage to the output voltage of a power amplifier so that the output voltage of the DC-DC converter is adjusted to a necessary power level of the power amplifier. As a result, efficiency of the power amplifier is improved.

Meanwhile, the current-mode DC-DC converter has a lot of advantages, for example, good liner-regulation, simplicity for phase compensation. Further, it is easy to limit current and increase to have a large capacity by arranging a plurality of the current mode DC-DC converters in parallel. Therefore, the current mode DC-DC converter has been widely used recently.

FIG. 1 illustrates a background DC-DC converter 100. The background DC-DC converter 100 includes a reference voltage generator 112, bleeder resistors RFB1 and RFB2, an error amplifier 110, a PWM comparator 111, a RS-flip-flop 121, a switching transistor M100, an inductor L1, a capacitor C1, a slope voltage generator 115, a driver circuit 116 and a compensation circuit 117.

The reference voltage generator 112 generates a reference voltage Vref. The bleeder resistors RFB1 and RFB2 generate a partial voltage of the output voltage by dividing an output voltage. An operation of the DC-DC converter 100 will be described.

The RS-flip-flop 121 is to be set at a rising edge of a clock signal CLK and an output voltage at an output terminal Q of the RS-flip-flop 121 becomes high level. The output voltage at an output terminal Q is input to a gate of the switching transistor M100 through the driver circuit 116. The switching transistor M100 is turned on.

When the switching transistor M100 is turned on, an inductance current IL of the inductor L1 is increased. The PWM comparator 111 outputs a reset signal to the RS-flip-flop 121 when the inductance current IL becomes a predetermined voltage which is determined by a voltage of the slope voltage generator 115 and a voltage of the compensation circuit 117. The RS-flip-flop 121 outputs a low level voltage at the output terminal Q of the RS-flip-flop 121. Then, the switching transistor M100 is shut off.

After the switching transistor M100 is shut off, a charge stored in the inductor L1 is being fed to the output terminal continuously through the diode D1 as the inductance current IL. The RS-flip-flop 121 is set again at a following rising edge of the clock signal CLK. The above series of the operations are repeated.

The error amplifier 110 amplifies a voltage difference between the reference voltage Vref and the partial voltage of the output voltage. An amplified voltage by the error amplifier 110 is input to non-inverted terminal of the PWM comparator 111 through the compensation circuit 117. The slope voltage generator 115 contributes to avoid sub-harmonic oscillation which may occur when on-duty of the PWM comparator 111 exceeds 50%.

With the background current-mode control DC-DC converter, it is possible to make the power circuit to have a wider dynamic range of the output voltage by some extent. However, there is a large demand for further improvement with respect to a possible voltage range which the power amplifier needs.

SUMMARY

This patent specification describes a novel a DC-DC converter which includes a switch configured to control an output voltage, a driver circuit configured to drive the switch, a flip-flop configured to control the driver circuit, an error amplifier configured to compare a feedback voltage of the output voltage with a reference voltage, a detector configured to sense an output current, a control voltage generator configured to generate a control voltage being ramped and a PWM comparator configured to compare the control voltage with an output voltage of the error amplifier and output a reset signal to the flip-flop. Ramping speed of the control voltage is changed in accordance with an external-control voltage input at an external-control terminal.

This patent specification further describes a novel DC-DC converter which includes the control voltage generator includes a compensation circuit to generate a ramping voltage, a slope voltage generator to generate the control voltage having a ramping waveform in accordance with the ramping voltage input from the compensation circuit and to output the control voltage to the PWM comparator and a slope voltage compensation circuit to generate a compensation current in accordance with the external-control voltage input at an external-control terminal. The ramping speed of the ramping voltage is being changed by the compensation current.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
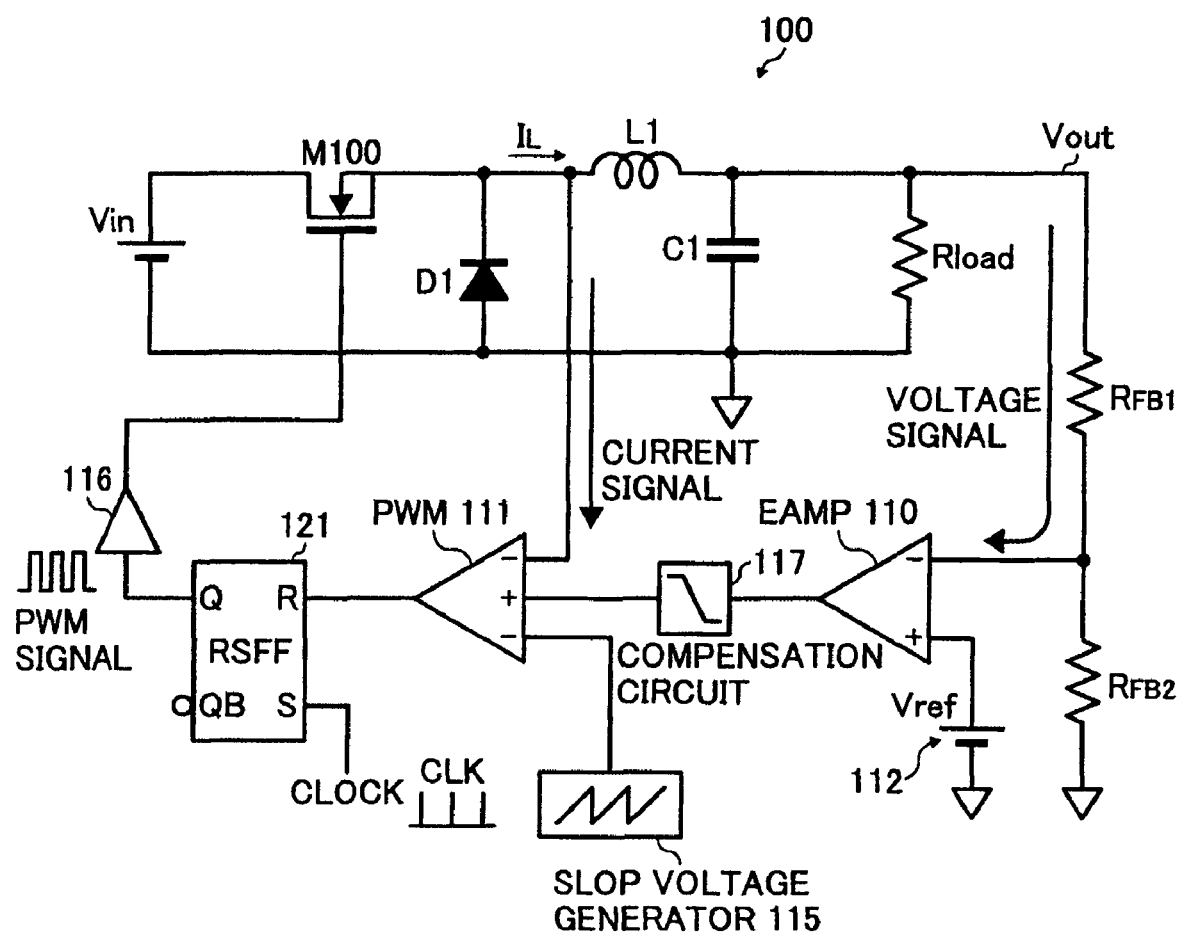
FIG. 1 illustrates a background DC-DC converter.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, a DC-DC converter according to exemplary embodiments are described.

Figure 2:
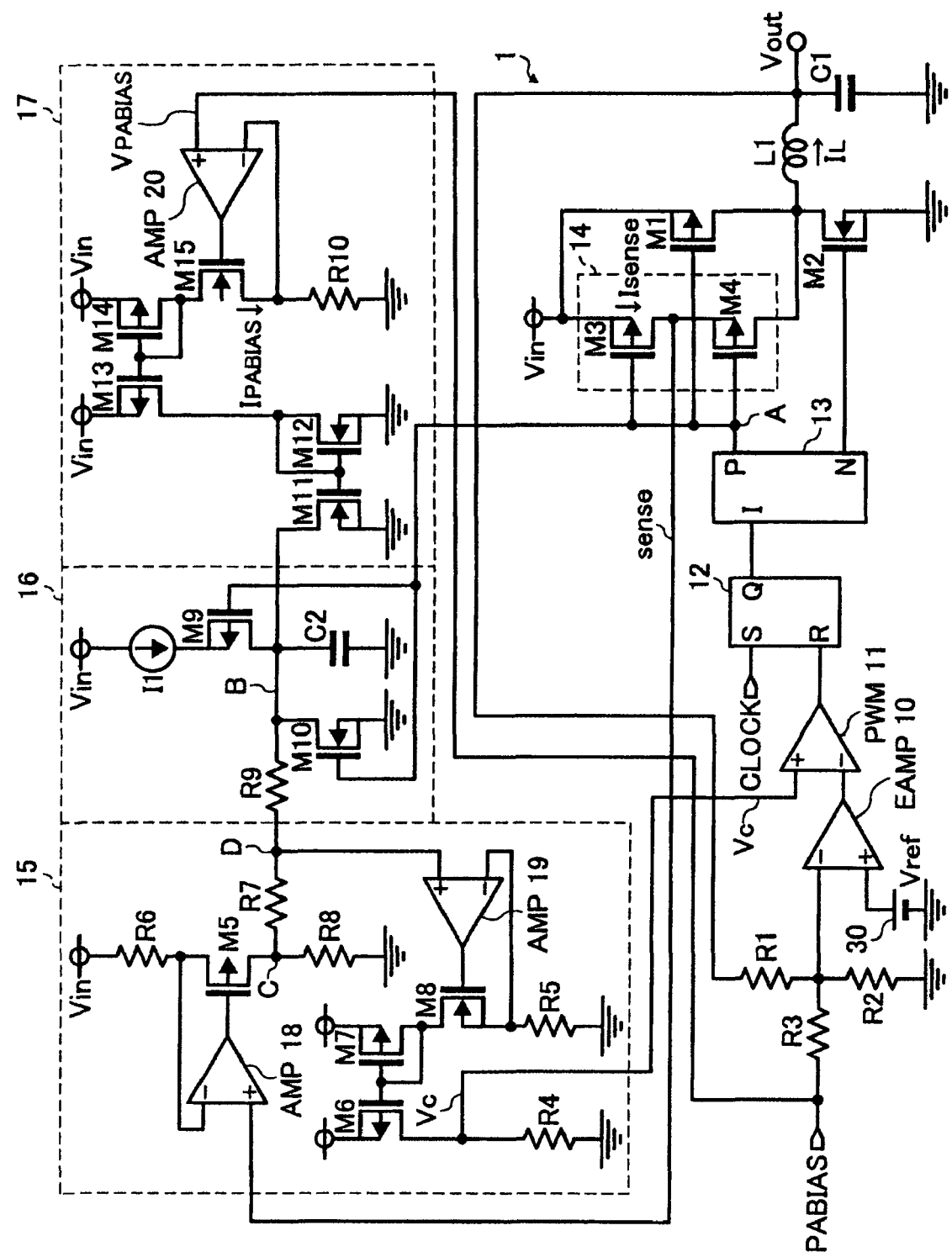
FIG. 2 illustrate an exemplary embodiment of a DC-DC converter according to the present disclosure.

FIG. 2 illustrates an exemplary embodiment of a DC-DC converter 1 according to the present disclosure. The DC-DC converter 1 employs a current-mode control.

The DC-DC converter 1 includes a reference voltage generator 30, bleeder resistors R1 and R2, an error amplifier 10, a PWM comparator 11, a RS-flip-flop 12, a driver circuit 13, a switching transistor M1, a rectifying transistor M2, an inductor L1, a capacitor C1, a detector 14, a slope voltage generator 15, a compensation circuit 16 and a slope voltage compensation circuit 17. Further, the DC-DC converter 1 includes a power terminal Vin, ground terminal, an output terminal Vout and an external-control terminal PABIAS.

Two resistors R1 and R2 form the bleeder resistors and are connected in series. The capacitor C1 and the bleeder resistors R1 and R2, are connected between the output terminal Vout and ground, respectively.

A connecting node of the bleeder resistors R1 and R2, is wired to an inverted input terminal of the error amplifier 10. Further, the connecting node of the bleeder resistors R1 and R2 and is wired to the external-control terminal PABIAS through the resistor R3.

The reference voltage generator 30 generates a reference voltage Vref. The reference voltage Vref is input to an non-inverted terminal of the error amplifier 10. The output terminal of the error amplifier 10 is wired to an inverted input terminal of the PWM comparator 11. A control voltage Vc from the slope voltage generator 15 is input to an non-inverted terminal of the PWM comparator 11. The output terminal of the PWM comparator 11 is wired to a reset input terminal R of the RS-flip-flop 12. An clock signal is input to a set terminal of the RS-flip-flop 12. The output terminal Q of the RS-flip-flop 12 is wired to an input terminal I of the driver circuit 13.

An output terminal P of the driver circuit 13 is wired to gates of the switching transistor M1, PMOS (p-type metal oxide semiconductor) transistors M3 and M4 of the detector 14, PMOS transistor M9 and NMOS (n-type metal oxide semiconductor) transistor M10 of the compensation circuit 16. An output terminal N of the driver circuit 13 is wired to a gate of the rectifying transistor M2.

A source of the switching transistor M1 is wired to the power terminal Vin and a drain of the switching transistor M1 is wired to a drain of the rectifying transistor M2. Further, the connecting node of the switching transistor M1 and the rectifying transistor M2 is wired to an output terminal Vout through the inductor L1.

The PMOS transistors M3 and M4 is connected in serial and a source of the PMOS transistor M4 is wired to the connecting node of the switching transistor M1 and the rectifying transistor M2. The PMOS transistors M3 and M4 of the detector 14 are switched on/off synchronously with the switching transistor M1 in accordance with the output signal of the output terminal P of the driver circuit 13. A sense current $I_{sense}$ that flows in the detector 14 will be described.

For example, when resistances of on-state of the switching transistor M1 and PMOS transistors M3 and M4 are 0.4Ω, 30Ω and 10Ω, respectively, the sense current $I_{sense}$ which flows in the PMOS transistor M3 is expressed by a formula, $$I_{sense} = IL \times 0.4/(0.4+30+10),$$

where IL is an inductance current which flows through the inductor L1. Then, the sense current $I_{sense}$ is approximately equal to IL/100. Namely, the sense current $I_{sense}$ is proportional to the inductance current IL. Therefore, the inductance current IL can be checked by measuring a voltage drop of the PMOS transistor M3.

The slope voltage generator 15 includes operational amplifiers 18 and 19, PMOS transistors M5, M6 and M7, a NMOS transistors MB and resistors R4 to R8. The PMOS transistors M5, M6 and M7, the NMOS transistors MB and the resistors R4 to R8. The PMOS transistors M6 and M7 form a current-mirror circuit.

A sense signal which is the voltage drop of the PMOS transistor M3 generated by the current $I_{sense}$ is input to an non-inverted input terminal of the operational amplifiers 18. A source of the PMOS transistor M5 is wired to the inverted input terminal of the operational amplifiers 18. A gate of the PMOS transistor M5 is wired to the output terminal of the operational amplifiers 18.

Furthermore, the source of the PMOS transistor M5 is connected to the power Vin through the resistor R6. A drain of the PMOS transistor M5 is connected to ground through the resistor R8. Further, the drain of the PMOS transistor M5 is wired to an non-inverted input terminal of the operational amplifiers 19 through the resistor R7.

A source of the NMOS transistor MB is wired to a inverted input terminal of the operational amplifiers 19 and is connected to ground through the resistor R5. An output terminal of the operational amplifiers 19 is wired a gate of the PMOS transistor MB. A drain of the NMOS transistors M8 is wired to a drain of the PMOS transistor M7.

A source of the PMOS transistor M7 is wired to the power terminal Vin. A drain of the PMOS transistor M7 is wired to gates of the PMOS transistors M6 and M7. A source of the PMOS transistor M6 is wired to the power terminal Vin and is connected to ground through the resistor R4. The source of the of the PMOS transistor M6 is wired to a non-inverted input terminal of the PWM comparator 11 to output the control voltage Vc from the slope voltage generator 15.

The compensation circuit 16 includes a current source I1, the PMOS transistor M9, the NMOS transistor M10, a capacitor C2 and a resistor R9. One end of the current source I1 is wired to the power terminal Vin and another end of the current source I1 is wired to a source of the PMOS transistor M9.

One end of the capacitor C2 is wired to a drain of the PMOS transistor M9. Another end of the capacitor C2 is wired to ground. The gate of the PMOS transistor M9 is wired to the output terminal P of the driver circuit 13. Through the resistor R9, a connecting node of the capacitor C2 and the PMOS transistor M9 is wired to the resistor R7 and is connected to the non-inverted input terminal of the operational amplifiers 19.

The slope voltage compensation circuit 17 includes an operational amplifiers 20, NMOS transistors M15, M11 and M12, PMOS transistors M13 and M14 and a resistor R10. The NMOS transistors M11 and M12, form one current mirror circuit and the PMOS transistors M13 and M14 form another current mirror circuit.

An external-control voltage $V_{PABIAS}$ is applied to an non-inverted input terminal of the operational amplifiers 20. A source of the NMOS transistor M15 is wired to the inverted input terminal of the operational amplifiers 20. Further, the source of the NMOS transistor M15 is connected to ground through the resistor R10. A gate of the NMOS transistor M15 is wired to the output terminal of the operational amplifiers 20. A drain of the NMOS transistor M15 is wired to a drain of the PMOS transistor M14.

A source of the PMOS transistor M14 is wired to the power terminal Vin. A drain of the PMOS transistor M14 is wired to a gate of the PMOS transistor M14 and to a gate of the PMOS transistor M13. A source of the PMOS transistor M13 is wired to the power terminal Vin. A drain of the PMOS transistor M13 is wired to a drain of the NMOS transistor M12.

A source of the NMOS transistor M12 is wired to ground. A gate of the NMOS transistor M12 is wired to the drain of the NMOS transistor M12 and to a gate of the NMOS transistor M11. A source of the NMOS transistor M11 is wired to ground. The drain of the NMOS transistor M11 is wired to the connecting node of the capacitor C2 and the PMOS transistor M9.

Figure 3:
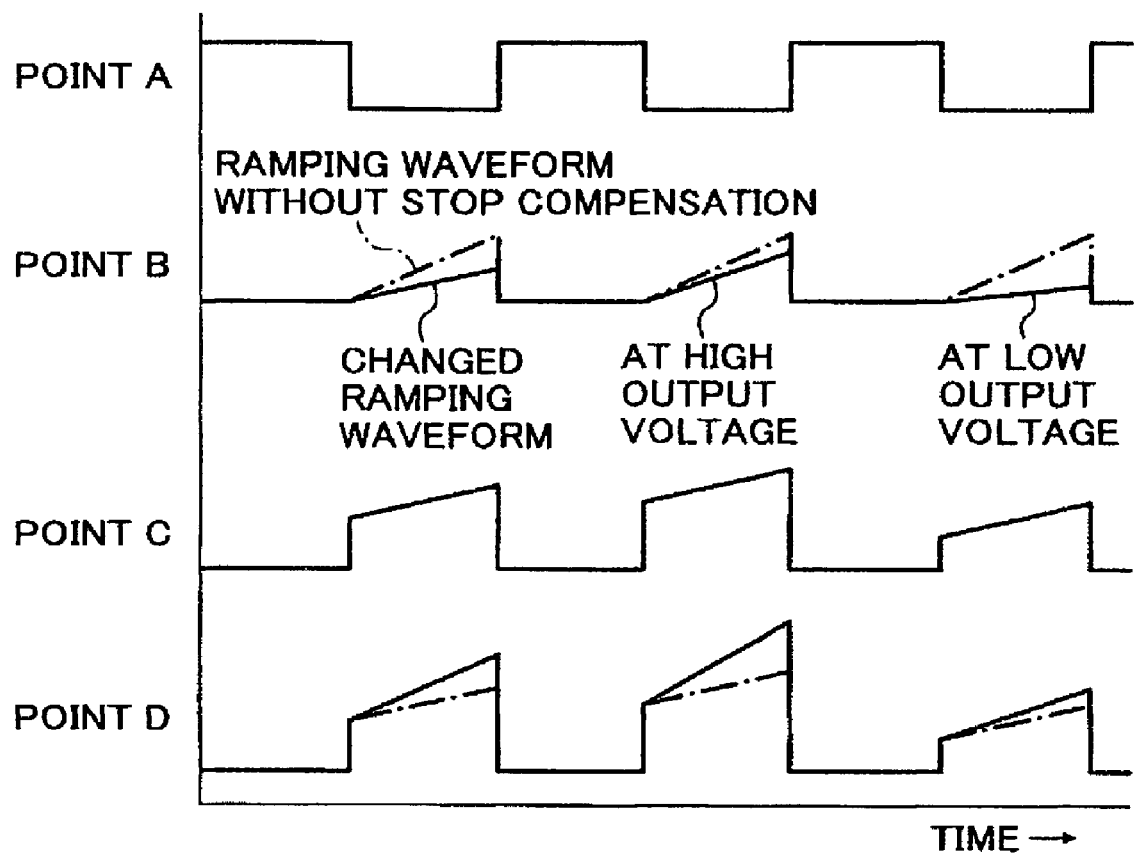
FIG. 3 illustrates waveforms during the operation of the DC-DC converter.

FIG. 3 illustrates waveforms during the operation of the DC-DC converter 1. Referring to FIG. 3, an operation of the DC-DC converter 1 of FIG. 2 will be described.

A clock pulse is input to a set-input terminal S of the RS-flip-flop 12. The RS-flip-flop 12 is to be set at a rising edge and falling edge of the clock pulse and outputs a high level at the output terminal Q.

The reset-input terminal R of the RS-flip-flop 12 is wired to an output terminal of the PWM comparator 11. Then, the RS-flip-flop 12 is reset by the output signal of the PWM comparator 11 after the RS-flip-flop 12 is set to be in a set-state. The output voltage of the output terminal Q of the RS-flip-flop 12 is returned to a low level.

The output terminal Q of the RS-flip-flop 12 is wired to the input terminal I of the driver circuit 13. Namely, the driver circuit 13 outputs a pulse signal to the output terminal P in accordance with the voltage level input to the input terminal I from the RS-flip-flop 12. The driver circuit 13 outputs to the rectifying transistor M2 with a drive signal having an equal phase to the pulse signal output from the output terminal P. A waveform at the output terminal P is shown as a waveform of point A in FIG. 3.

When the output voltage at the output terminal P of the driver circuit 13 is low level, the switching transistor M1, the PMOS transistors M3 and M4, are turned on. As a result, the sense current $I_{sense}$ flows trough the PMOS transistors M3. The voltage at the node SENSE is dropped. The voltage at the node SENSE is defined as a sense voltage. The voltage drop of the node SENSE is input to the slope voltage generator 15.

In the slope voltage generator 15, the sense voltage is converts to a ground based voltage which is a potential from ground. The operational amplifier 18 amplifies the sense voltage by a predetermined magnifying factor m. The magnifying factor m is determined by the ratio of the resistors R6 and RB and is expressed by a formula, m=R8/R6.

In this exemplary embodiment, the resistances of the resistors R6 and R8 are 10KΩ and 50KΩ, respectively. Therefore, the magnifying factor m is 5. An output waveform of an amplified voltage is shown as waveform of point C in FIG. 3.

In the compensation circuit 16, when the switching transistor M1 is turned on, the PMOS transistor M9 is turned on and the NMOS transistor M10 is turned off because gates of the PMOS transistor M9 and the NMOS transistor M10 are wired to the output terminal P of the driver circuit 13. Further, when the switching transistor M1 is turned off, the PMOS transistor M9 is turned off and the NMOS transistor M10 is turned on.

When the switching transistor M1 is turned on, the current source I1 starts to charge the capacitor C2. A voltage of the capacitor C2, which is a voltage at point B in FIG. 2, is being increased as shown by a dotted line of waveform point B in FIG. 3. Thus, a ramping voltage is generated so as to compensate a change of the output voltage. The voltage of the capacitor C2 is decreased rapidly when the NMOS transistor M10 is turned on.

The ramping voltage at the capacitor C2 is input to a non-inverted input terminal of the operational amplifiers 19 through the resistor R9. A voltage input to the operational amplifier 19 (at point D) is shown by a waveform of point D in FIG. 3. This circuit configuration contributes to avoid sub-harmonic oscillation because the voltage of the capacitor C2 is added to the amplified voltage at a point C.

However, if a dynamic range of the external-control voltage $V_{PABIAS}$ is wide, it may be not possible to compensate a whole range of the change of the output voltage only by the ramping voltage generated at the compensation circuit 16. As a result, the power circuit may operate unstably.

The slope voltage compensation circuit 17 generates the control voltage Vc by changing a ramping speed of the ramping voltage so that the power circuit performs a stabile operation even at the wider range of the external-control voltage $V_{PABIAS}$. The external-control voltage $V_{PABIAS}$ is converted to a current signal $I_{PABIAS}$ by the operational amplifier 20, the NMOS transistor 15 and the resistor 10.

An increasing/decreasing direction of current is changed by the current mirror circuit. If a current signal $I_{PABIAS}$ is increased, a current of the PMOS transistor M13 and the NMOS transistor M12 is decreased in accordance with the change of the current signal $I_{PABIAS}$. The changed current signal is fed to the compensation circuit 16 through the NMOS transistor M11. A current of the NMOS transistor M11 is increased because the NMOS transistors M11 and M12 form the current mirror circuit.

A part of the charging current from the current source I1 is bypassed by the current of the NMOS transistor M11. Thus, the charging current for the capacitor C2 is decreased. Namely, when the current signal $I_{PABIAS}$ is increased, the charging current for the capacitor C2 is decreased. As a result, the ramping speed is decreased.

A relation between the external-control voltage $V_{PABIAS}$ and the current signal $I_{PABIAS}$ is expressed by a formula, $I_{PABIAS}=V_{PABIAS}/R10$. When the external-control voltage $V_{PABIAS}$ is being increased, the ramping speed is being decreased. Further, the output voltage Vout is being decreased when the external-control voltage $V_{PABIAS}$ is being increased. Namely, the ramping speed of the ramping voltage becomes slower when the output voltage is lower as shown by a third triangular pulse of the waveform of point B in FIG. 3. Thus, a slope of the triangular pulse waveform of point B is changed.

As described, the ramping speed is controlled in accordance with the change of the output voltage Vout. It is possible to achieve a stable power source which works in a wide dynamic range of the output voltage by employing the current-mode control DC-DC converter according to the present disclosure.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. 2006-024118 filed on Feb. 1, 2006 in the Japan Patent Office, the entire contents of which are incorporated by reference herein.

What is claimed is:

1. A communication equipment which employs a DC-DC converter, the DC-DC converter comprising:
a switch configured to control an output voltage;
a driver circuit configured to drive the switch;
a flip-flop configured to control the driver circuit;
an error amplifier configured to compare a feedback voltage of the output voltage with a reference voltage;
a detector configured to sense an output current;
a control voltage generator configured to generate a control voltage being ramped; and
a PWM comparator configured to compare the control voltage with an output voltage of the error amplifier and output a reset signal to the flip-flop,
wherein ramping speed of the control voltage is changed in accordance with an external-control voltage input at an external-control terminal.

2. The communication equipment of claim 1,
wherein the control voltage generator includes
a compensation circuit to generate a ramping voltage,
a slope voltage generator to generate the control voltage having a ramping waveform in accordance with the ramping voltage input from the compensation circuit and to output the control voltage to the PWM comparators, and
a slope voltage compensation circuit to generate a compensation current in accordance with the external-control voltage input at the external-control terminal,
and wherein the ramping speed of the ramping voltage is being changed by the compensation current.

3. The communication equipment of claim 1, wherein the DC-DC converter further comprises:
bleeder resistors configured to generate a proportional voltage by dividing the output voltage and output to the error amplifier as the feedback voltage,
wherein the error amplifier amplifies a voltage difference between the proportional voltage of the output voltage and the reference voltage,
and wherein the external-control voltage is input to a connecting node of the bleeder resistors through an input resistor.

4. The communication equipment of claim 2, wherein the compensation current of the slope voltage compensation circuit is changed so as to decrease the ramping speed of the ramping voltage when the output voltage is decreased and increase the ramping speed of the ramping voltage when the output voltage is increased.

5. The communication equipment of claim 2, wherein the slope voltage generator includes
a capacitor to be charged and one end is wired to ground,
a current source to feed a current to the capacitor,
a first switching transistor connected between the current source and one end of the capacitor,
a second switching transistor connected in parallel to the capacitor,
and wherein the ramping voltage which is input to a first amplifier arranged in the slope voltage generator is increased by charging the capacitor when the first switching transistor is on and the second switching transistor is off,
and wherein the ramping voltage is decreased by discharging the capacitor when the first switching transistor is off and the second switching transistor is on.

6. The communication equipment of claim 2, wherein the slope voltage compensation circuit includes
a second amplifier to convert the external-control voltage to a current signal,
a first current mirror circuit to change an increasing/decreasing direction of the current signal, and
a second current mirror circuit to bypass the charging current of the capacitor in accordance with the current signal so as to change the ramping speed of the ramping voltage.

7. The communication equipment of claim 1, wherein the DC-DC converter further comprises:
an inductor connected in series with the switch between an input voltage terminal and an output voltage terminal,
wherein the detector senses a proportional current to a current flowing in the inductor.

8. A communication equipment which employs a DC-DC converter, the DC-DC converter comprising:
an output voltage control circuit configured to control an output voltage;
an error amplifier configured to compare a feedback voltage of the output voltage with a reference voltage;
a control voltage generator configured to generate a control voltage; and
a PWM comparator configured to compare the control voltage with an output of the error amplifier and output a reset signal to the output voltage control circuit,
wherein ramping speed of the control voltage is changed in accordance with an external-control voltage input at an external-control terminal.

9. The communication equipment of claim 8,
wherein the control voltage generator includes
a compensation circuit to generate a ramping voltage,
a slope voltage generator to generate the control voltage having a ramping waveform in accordance with the ramping voltage input from the compensation circuit and to output the control voltage to the PWM comparator, and
a slope voltage compensation circuit to generate a compensation current in accordance with the external-control voltage input at the external-control terminal,
and wherein the ramping speed of the ramping voltage is being changed by the compensation current.

10. The communication equipment of claim 9, wherein the compensation current of the slope voltage compensation circuit is changed so as to decrease the ramping speed of the ramping voltage when the output voltage is decreased and increase the ramping speed of the ramping voltage when the output voltage is increased.

11. The communication equipment of claim 9, wherein the slope voltage generator includes
a capacitor to be charged and one end is wired to ground,
a current source to feed a current to the capacitor,
a first switching transistor connected between the current source and one end of the capacitor,
a second switching transistor connected in parallel to the capacitor,
and wherein the ramping voltage which is input to a first amplifier arranged in the slope voltage generator is increased by charging the capacitor when the first switching transistor is on and the second switching transistor is off,
and wherein the ramping voltage is decreased by discharging the capacitor when the first switching transistor is off and the second switching transistor is on.

12. The communication equipment of claim 9, wherein the slope voltage compensation circuit includes
a second amplifier to convert the external-control voltage to a current signal,
a first current mirror circuit to change an increasing/decreasing direction of the current signal, and a second current mirror circuit to bypass the charging current of the capacitor in accordance with the current signal so as to change the ramping speed of the ramping voltage.

13. The communication equipment of claim 8, wherein the DC-DC converter further comprises:
bleeder resistors configured to generate a proportional voltage by dividing the output voltage and output to the error amplifier as the feedback voltage,
wherein the error amplifier amplifies a voltage difference between the proportional voltage of the output voltage and the reference voltage,
and wherein the external-control voltage is input to a connecting node of the bleeder resistors through an input resistor.

14. A DC-DC converter comprising:
an output voltage control circuit configured to control an output voltage;
an error amplifier configured to compare a feedback voltage of the output voltage with a reference voltage;
a control voltage generator configured to generate a control voltage; and
a PWM comparator configured to compare the control voltage with an output of the error amplifier and output a reset signal to the output voltage control circuit,
wherein ramping speed of the control voltage is changed in accordance with an external-control voltage input at an external-control terminal.

15. The DC-DC converter of claim 14,
wherein the control voltage generator includes
a compensation circuit to generate a ramping voltage,
a slope voltage generator to generate the control voltage having a ramping waveform in accordance with the ramping voltage input from the compensation circuit and to output the control voltage to the PWM comparator, and
a slope voltage compensation circuit to generate a compensation current in accordance with the external-control voltage input at the external-control terminal,
and wherein the ramping speed of the ramping voltage is being changed by the compensation current.

16. The DC-DC converter of claim 15, wherein the compensation current of the slope voltage compensation circuit is changed so as to decrease the ramping speed of the ramping voltage when the output voltage is decreased and increase the ramping speed of the ramping voltage when the output voltage is increased.

17. The DC-DC converter of claim 15, wherein the slope voltage generator includes
a capacitor to be charged and one end is wired to ground,
a current source to feed a current to the capacitor,
a first switching transistor connected between the current source and one end of the capacitor,
a second switching transistor connected in parallel to the capacitor,
and wherein the ramping voltage which is input to a first amplifier arranged in the slope voltage generator is increased by charging the capacitor when the first switching transistor is on and the second switching transistor is off,
and wherein the ramping voltage is decreased by discharging the capacitor when the first switching transistor is off and the second switching transistor is on.

18. The DC-DC converter of claim 15, wherein the slope voltage compensation circuit includes
a second amplifier to convert the external-control voltage to a current signal,
a first current mirror circuit to change an increasing/decreasing direction of the current signal, and
a second current mirror circuit to bypass the charging current of the capacitor in accordance with the current signal so as to change the ramping speed of the ramping voltage.

19. The DC-DC converter of claim 14, wherein the DC-DC converter further comprises:
bleeder resistors configured to generate a proportional voltage by dividing the output voltage and output to the error amplifier as the feedback voltage,
wherein the error amplifier amplifies a voltage difference between the proportional voltage of the output voltage and the reference voltage,
and wherein the external-control voltage is input to a connecting node of the bleeder resistors through an input resistor.

* * * * *